United States Patent
Roberts et al.

(10) Patent No.: US 8,584,647 B2
(45) Date of Patent: Nov. 19, 2013

(54) ENGINE CONTROL SYSTEM FOR INCREASED VEHICLE FUEL ECONOMY

(75) Inventors: Colin A. Roberts, Longview, TX (US);
Richard H. Clutz, Howell, MI (US);
Robert Paul Black, Milford, MI (US);
Kevin J. Storch, Brighton, MI (US);
Alfred E. Spitza, Jr., Brighton, MI (US);
Richard L. Tiberg, Milford, MI (US);
William S. Beggs, Fenton, MI (US);
Bala K. Murthy, Troy, MI (US);
Terrence E. Connolly, Rochester, MI (US);
Mike M. McDonald, Macomb, MI (US);
William C. Albertson, Clinton Township, MI (US);
Eric S. Kaufman, Orion, MI (US)

(73) Assignee: GM Global Technology Operations LLC

( * ) Notice: Subject to any disclaimer, the term of this patent is extended or adjusted under 35 U.S.C. 154(b) by 1100 days.

(21) Appl. No.: 12/328,060

(22) Filed: Dec. 4, 2008

(65) Prior Publication Data
US 2009/0173311 A1    Jul. 9, 2009

Related U.S. Application Data

(60) Provisional application No. 61/019,870, filed on Jan. 9, 2008.

(51) Int. Cl.
*F02D 13/06* (2006.01)

(52) U.S. Cl.
USPC .................. 123/198 F; 701/101; 701/112

(58) Field of Classification Search
USPC ................ 123/198 F, 481; 701/110, 112, 115
See application file for complete search history.

(56) References Cited

U.S. PATENT DOCUMENTS

| | | | |
|---|---|---|---|
| 5,685,800 A * | 11/1997 | Toukura .......................... | 477/90 |
| 6,307,376 B1 | 10/2001 | Alexander et al. | |
| 6,435,156 B1 * | 8/2002 | Copus ......................... | 123/198 F |
| 6,591,185 B1 * | 7/2003 | Polidi et al. .................... | 701/411 |
| 6,668,546 B2 * | 12/2003 | Hayman et al. ................. | 60/284 |
| 6,691,807 B1 * | 2/2004 | Bhavsar et al. ............. | 180/65.21 |
| 6,752,121 B2 | 6/2004 | Rayl et al. | |
| 7,021,282 B1 * | 4/2006 | Livshiz et al. ................. | 123/347 |
| 7,059,997 B2 * | 6/2006 | Nishizawa et al. ............... | 477/3 |
| 7,080,625 B2 * | 7/2006 | Albertson et al. ............. | 123/325 |
| 7,198,029 B1 * | 4/2007 | Wong et al. .................... | 123/350 |
| 7,231,907 B2 * | 6/2007 | Bolander et al. .............. | 123/481 |
| 7,249,583 B2 * | 7/2007 | Bidner et al. .......... | 123/198 DB |
| 7,278,391 B1 * | 10/2007 | Wong et al. ................. | 123/198 F |
| 7,357,019 B2 | 4/2008 | McDonald et al. | |
| 2006/0130814 A1 * | 6/2006 | Bolander et al. .............. | 123/481 |
| 2006/0162700 A1 * | 7/2006 | Kubani et al. ................. | 123/479 |

FOREIGN PATENT DOCUMENTS

| | | |
|---|---|---|
| DE | 10219666 A1 | 2/2003 |
| DE | 102005016006 A1 | 10/2006 |
| DE | 102005042846 A1 | 3/2007 |

* cited by examiner

*Primary Examiner* — Noah Kamen
*Assistant Examiner* — Grant Moubry

(57) ABSTRACT

An engine control system comprises a driver input module, a cylinder actuation module, and an active fuel management (AFM) module. The driver input module generates a fuel saver mode (FSM) signal having a first state based upon a driver input. The cylinder actuation module selectively disables at least one of a plurality of cylinders of an engine based upon a deactivation signal having a first state. The AFM module generates the deactivation signal based on at least one engine parameter and at least one threshold. The at least one threshold is modified when the FSM signal has the first state.

16 Claims, 6 Drawing Sheets

ENGINE CONTROL SYSTEM FOR INCREASED VEHICLE FUEL ECONOMY

CROSS-REFERENCE TO RELATED APPLICATIONS

This application claims the benefit of U.S. Provisional Application No. 61/019,870, filed on Jan. 9, 2008. The disclosure of the above application is incorporated herein by reference.

FIELD

The present disclosure relates to internal combustion engines and more particularly to engine control systems and methods that improve fuel economy.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system according to the prior art is presented. An internal combustion engine 100 is controlled by a control module 104. The control module 104 also controls a transmission 108. The control module 104 receives driver input from an accelerator input module 110 and from a transmission input module 112.

The accelerator input module 110 may include an accelerator pedal and pedal position sensors. The transmission input module 112 may include a gearshift lever, gearshift paddles, and/or gearshift buttons. Based on the driver input, the control module 104 controls a throttle valve 116. The throttle valve 116 regulates air intake into an intake manifold 118 of the engine 100. The position of the throttle valve 116 may be measured by a throttle position sensor 120.

The amount of air flowing into the intake manifold 118 may be measured by a mass air flow (MAF) sensor 122. The pressure inside the intake manifold 118 may be measured by a manifold absolute pressure (MAP) sensor 124. Air from the intake manifold 118 is combined with fuel to create an air-fuel mixture in one or more cylinders 126. For example only, eight cylinders 126 are shown in FIG. 1, although more or fewer cylinders may be present.

Combusting the air-fuel mixture in the cylinders 126 produces torque to turn a crankshaft (not shown). The crankshaft is coupled to the transmission 108 via a torque transmitting device 130, such as a torque converter or a clutch. The speed of the crankshaft may be measured by an RPM (revolutions per minute) sensor 132. When maximum torque is not required, one or more of the cylinders 126 may be disabled to improve fuel economy. For example, the cylinders 126 having diagonal hash marks, such as the cylinder 126-1, may be disabled.

The control module 104 operates a lifter oil manifold assembly (LOMA) 134 to disable selected ones of the cylinders 126. Valves (not shown) of each of the cylinders 126 may be actuated by rocker arms via pushrods driven off a camshaft. Lifters interface between the camshafts and pushrods. Alternatively, lifters may directly interface between the camshafts and valves in an overhead cam engine configuration. There is a hydraulically switchable lost motion portion of the lifters. In order to disable the selected cylinders, the LOMA 134 hydraulically decouples the lifters using solenoid-actuated valves. The intake and/or exhaust valves of the selected cylinders will then remain closed, disabling those cylinders.

SUMMARY

An engine control system comprises a driver input module, a cylinder actuation module, and an active fuel management (AFM) module. The driver input module generates a fuel saver mode (FSM) signal having a first state based upon a driver input. The cylinder actuation module selectively disables at least one of a plurality of cylinders of an engine based upon a deactivation signal having a first state. The AFM module generates the deactivation signal based on at least one engine parameter and at least one threshold. The at least one threshold is modified when the FSM signal has the first state.

A method of controlling an engine control system comprises generating a fuel saver mode (FSM) signal having a first state based upon a driver input; selectively disabling at least one of a plurality of cylinders of an engine based upon a deactivation signal having a first state; generating the deactivation signal based on at least one engine parameter and at least one threshold; and modifying the at least one threshold when the FSM signal has the first state.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
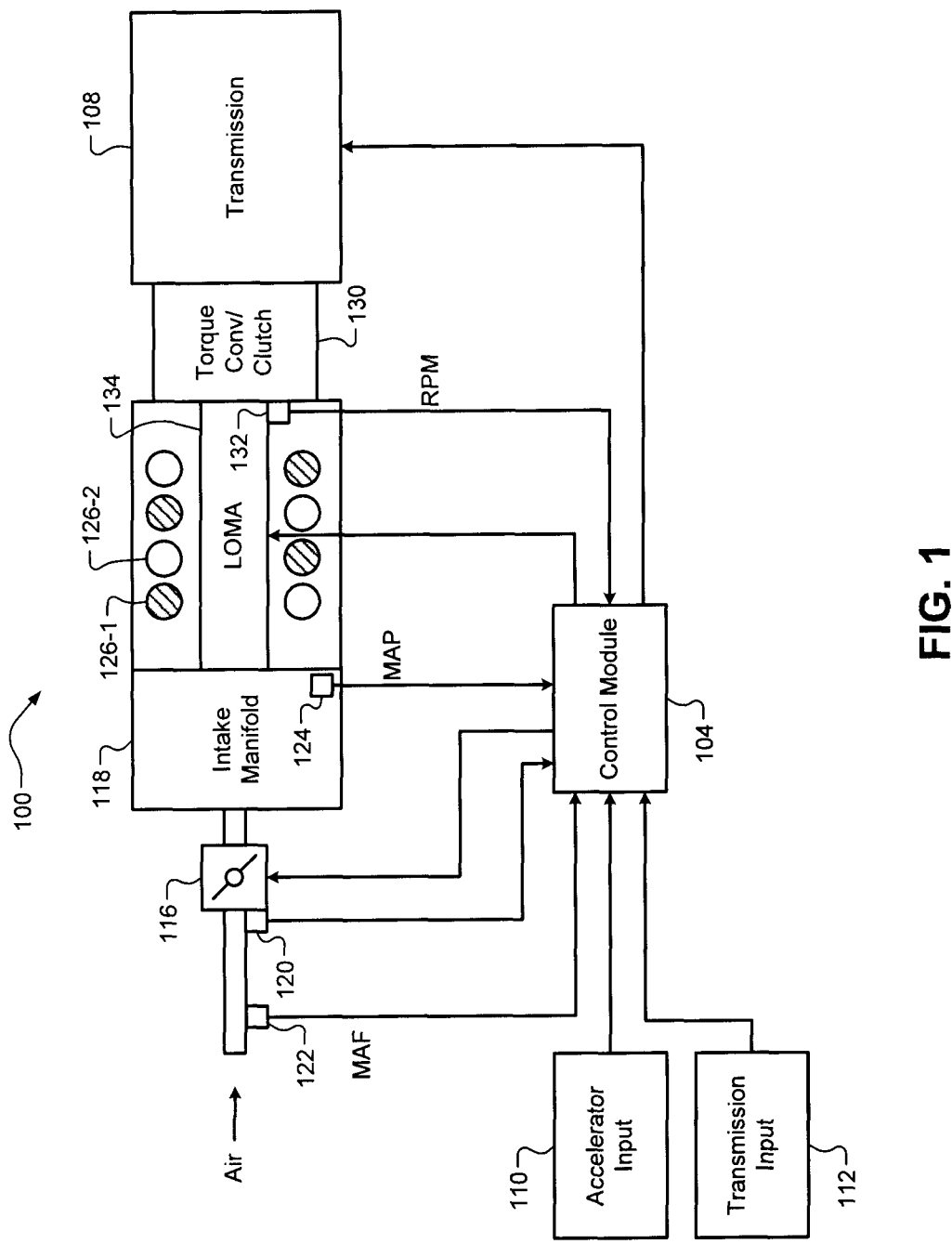
FIG. 1 is a functional block diagram of an engine system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Internal combustion engines may be operated using fewer than all of their cylinders in order to improve fuel economy. For example, an eight-cylinder engine may be operated using four cylinders, thereby improving fuel economy by reducing pumping losses. This capability is herein referred to as active fuel management (AFM). AFM may deactivate one or more of the engine's cylinders. In various implementations, AFM may deactivate a predetermined number of the cylinders, such as half of the cylinders. In various implementations, AFM may disable cylinders individually.

The use of AFM may be limited by noise, vibration, and harshness (NVH) concerns, as well as performance and drivability concerns. For example, at a given RPM, AFM operation may be disabled when manifold absolute pressure (MAP) is outside of a range defined between a first predetermined pressure and a second predetermined pressure. In various implementations, a table of lower and upper MAP limits for AFM operation as a function of RPM may be stored.

Figure 2A:
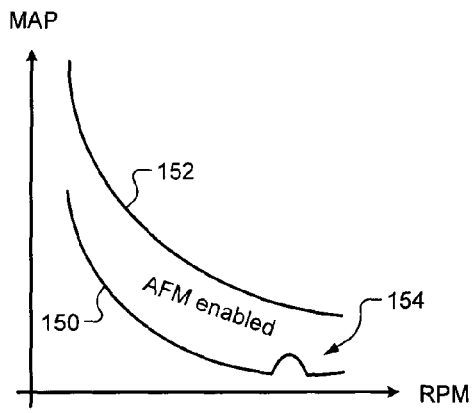
FIG. 2A is a graphical depiction of exemplary upper and lower pressure constraints for active fuel management (AFM) operation.

Referring now to FIG. 2A, exemplary upper and lower MAP constraints for AFM operation are graphically depicted. In this example, AFM may operate at points in the MAP-RPM plane above a lower limit 150 and below an upper limit 152. There may be various RPM points and/or ranges where the lower and/or upper limits 150 and 152 are more restrictive. For example only, the lower limit 150 increases locally for a small RPM range as shown at 154.

When a driver desires to increase fuel economy, they may be willing to accept slightly degraded NVH, performance, and/or drivability performance. If the driver indicates that this is the case, a fuel saver mode (FSM) may be enabled. For example only, the driver may push a button to engage FSM. FSM may attempt to increase fuel economy by modifying, for example, AFM mapping, accelerator position mapping, and/or shift mapping. When FSM is engaged, AFM operation may be adapted, such as by increasing the MAP range in which AFM is employed. Alternatively or additionally, any other parameters used to regulate AFM operation may be adapted.

Figure 2B:
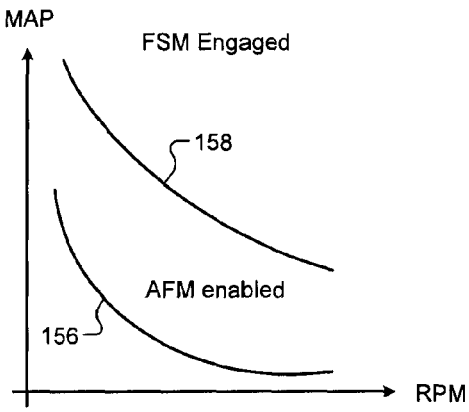
FIG. 2B is a graphical depiction of exemplary lower and upper pressure constraints for AFM operation when fuel saver mode (FSM) is engaged.

Referring now to FIG. 2B, exemplary lower and upper limits 156 and 158 for AFM operation when FSM is engaged are graphically depicted. The MAP range of AFM may be expanded for one or more RPM increments. In this example, the lower limit 156 does not have the local increase shown at 154 in FIG. 2A. In addition, the upper limit 158 is increased compared to that shown in FIG. 2A.

Figure 3A:
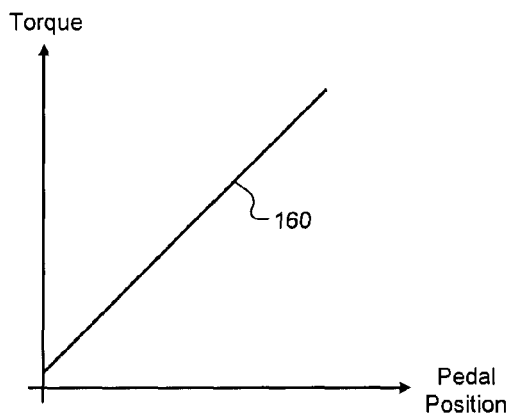
FIG. 3A is a graphical depiction of an exemplary mapping between accelerator pedal input and requested engine torque.

Referring now to FIG. 3A, an exemplary mapping 160 between accelerator pedal input and requested engine torque is graphically depicted. In this example, at a given vehicle speed, the torque request increases linearly with pedal position.

Figure 3B:
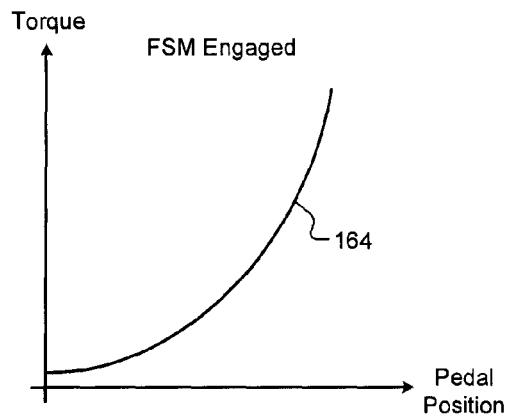
FIG. 3B is a graphical depiction of an exemplary mapping between accelerator pedal input and requested engine torque when FSM is engaged.

In FIG. 3B, an exemplary mapping 164 between accelerator pedal input and requested engine torque when FSM is engaged is graphically depicted. In this example, the derivative of the torque request increases approximately linearly with pedal position. This leads to an arc shape when graphed.

In various implementations, the arc-shaped mapping 164 may share its endpoints with the line-shaped mapping 160 of FIG. 3A, while at other pedal positions, the arc-shaped mapping 164 may be below the line-shaped mapping 160. By sharing the endpoints, the response to minimum and maximum pedal position will be the same whether FSM is engaged or not. In this way, maximum pedal position can still result in advertised top speed and quickest acceleration.

In various implementations, a constant position of the accelerator input may be translated to a torque that maintains the vehicle at its current speed, instead of at a greater torque, which may accelerate the vehicle. In this way, in order to accelerate the vehicle, a driver increases the accelerator input.

Figure 4A:
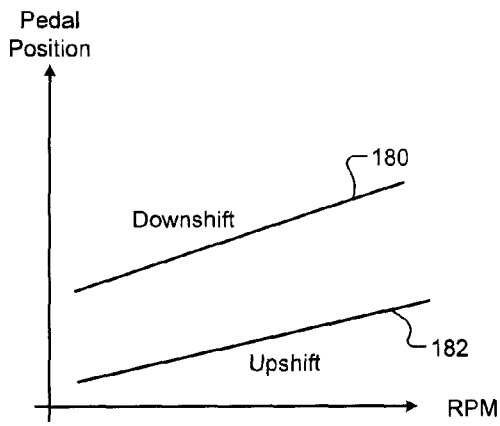
FIG. 4A is a graphical depiction of an exemplary shift map for a given transmission gear.

Referring now to FIG. 4A, an exemplary shift map for a given transmission gear is graphically depicted. For example, at a given RPM, the transmission may downshift when the pedal position increases above a predetermined threshold. In addition, at a given pedal position, the transmission may upshift when the RPM rises above a predetermined threshold. The downshift and upshift thresholds may be represented as lines 180 and 182 in the pedal-position-RPM plane.

Figure 4B:
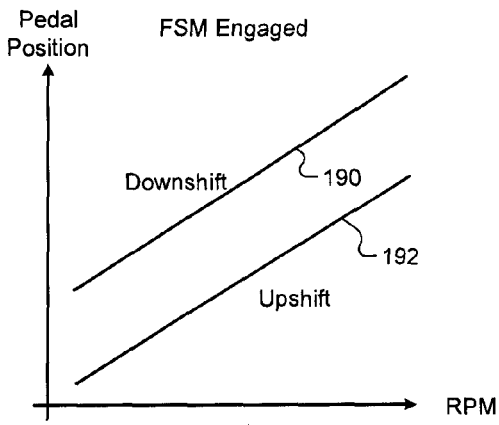
FIG. 4B is a graphical depiction of an exemplary shift map for a given transmission gear when FSM is engaged.

In FIG. 4B, an exemplary shift map for the given transmission gear when FSM is engaged is graphically depicted. In various implementations, the shift map for every gear may be modified when FSM is engaged. Multiple sets of maps may be stored, corresponding to whether FSM is engaged or not. Alternatively, a single set of maps may be mathematically modified or combined with mathematical adjustments when FSM is either engaged or disengaged. When FSM is engaged, downshifts may require a greater pedal position. In addition, the pedal position at which an upshift occurs may be increased. In various implementations, the downshift and upshift maps may be lines 190 and 192 having slopes that are greater than the corresponding lines of the shift maps in FIG. 4A.

Figure 5:
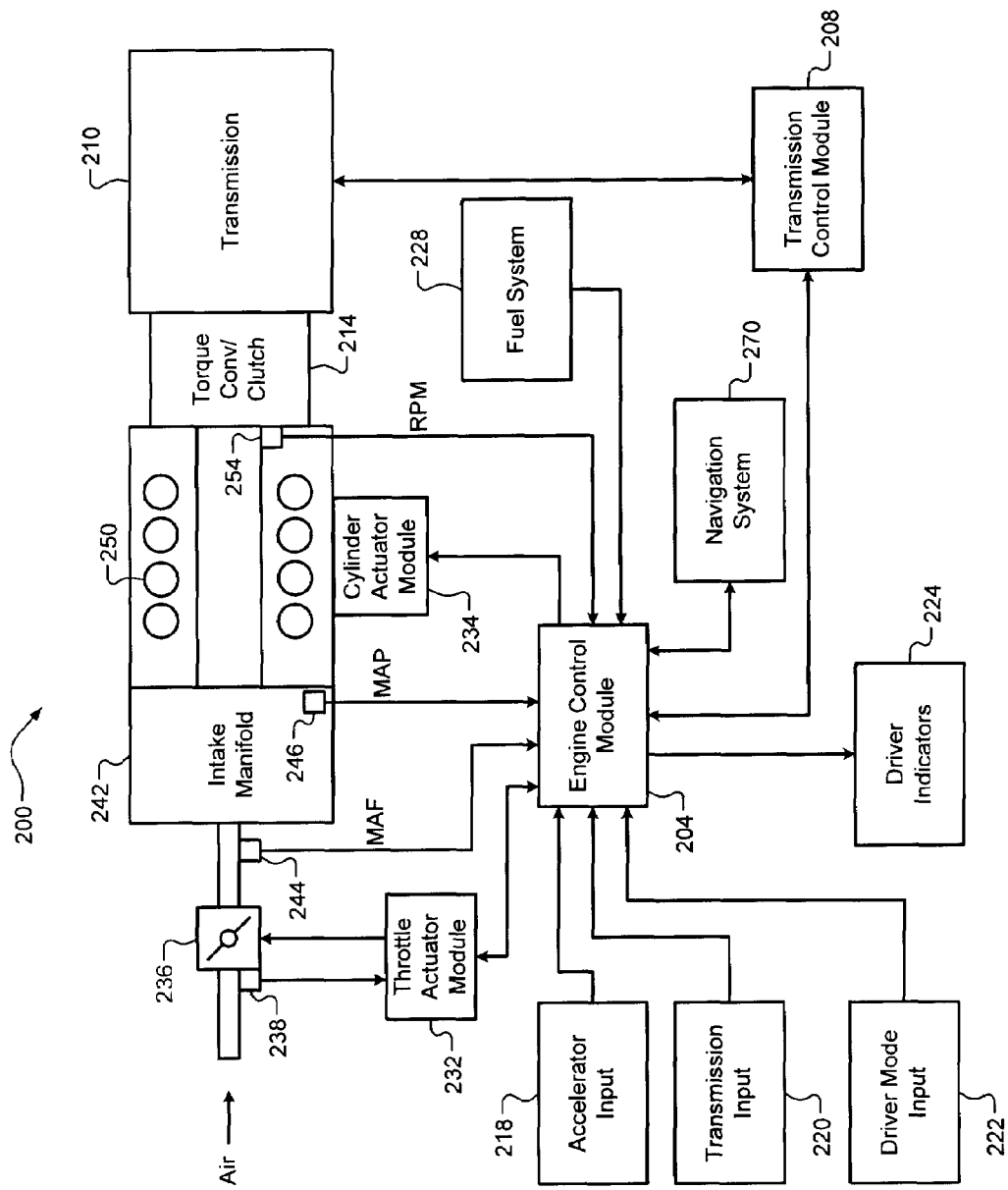
FIG. 5 is a functional block diagram of an exemplary powertrain system according to the principles of the present disclosure.
Figure 6:
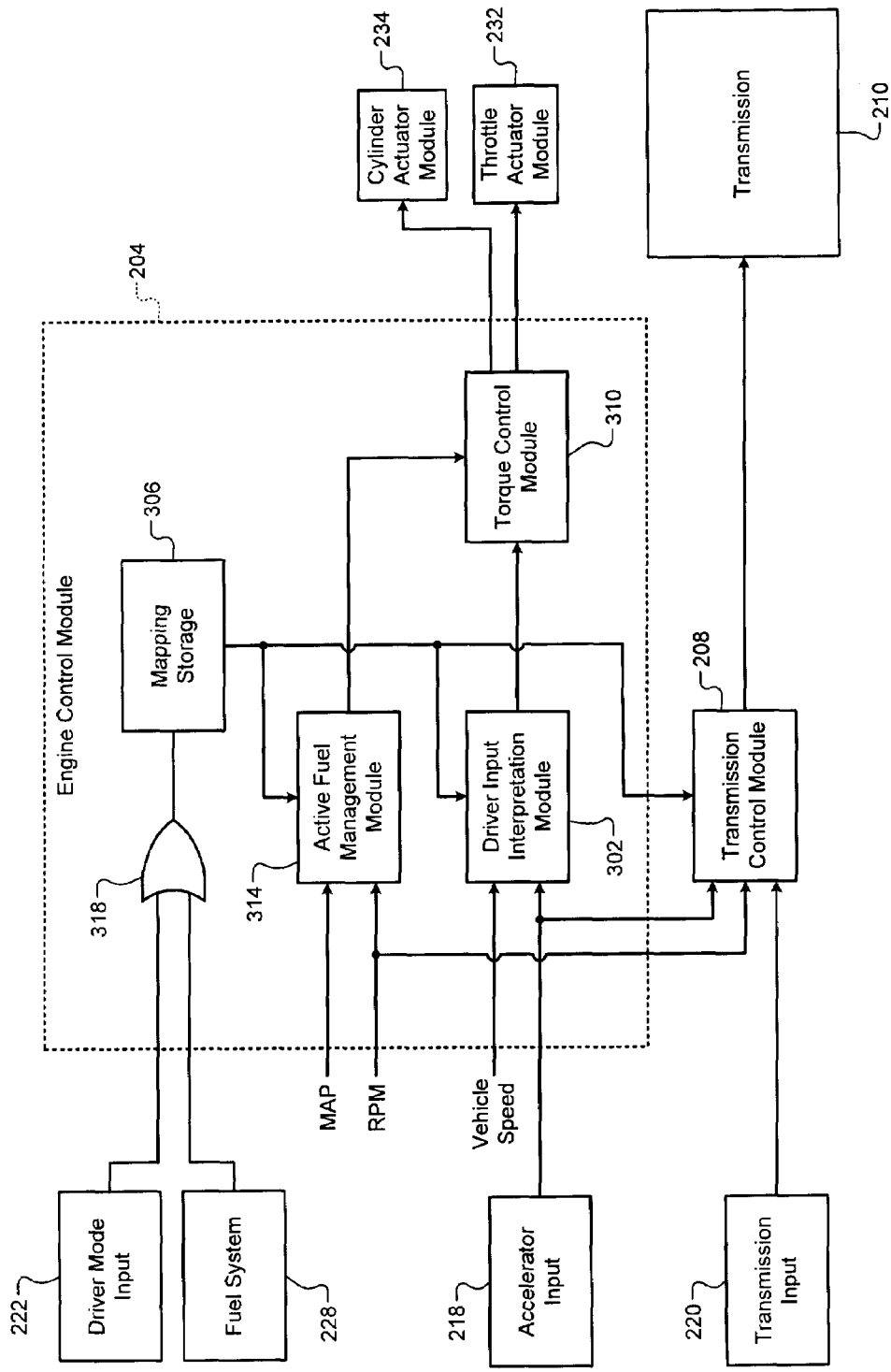
FIG. 6 is a functional block diagram of an exemplary implementation of the engine control module of FIG. 5.

As an overview, FIG. 5 shows an exemplary engine system that implements FSM, while FIG. 6 shows an exemplary implementation of the engine control module of FIG. 5. FSM may be automatically engaged when the amount of fuel in the fuel tank decreases below a predetermined amount. For example, this may correspond to the low fuel indicator being illuminated on an instrument panel of the vehicle.

Figure 7:
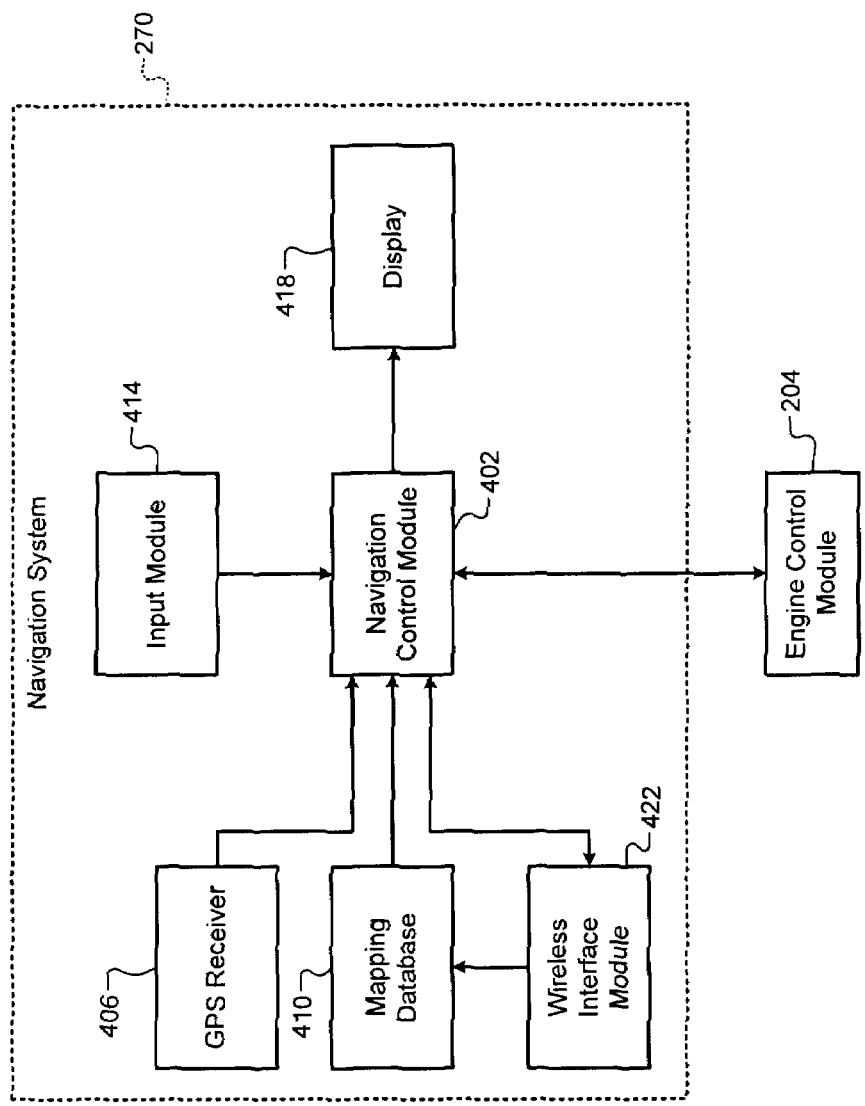
FIG. 7 is a functional block diagram of an exemplary implementation of the navigation system.
Figure 8:
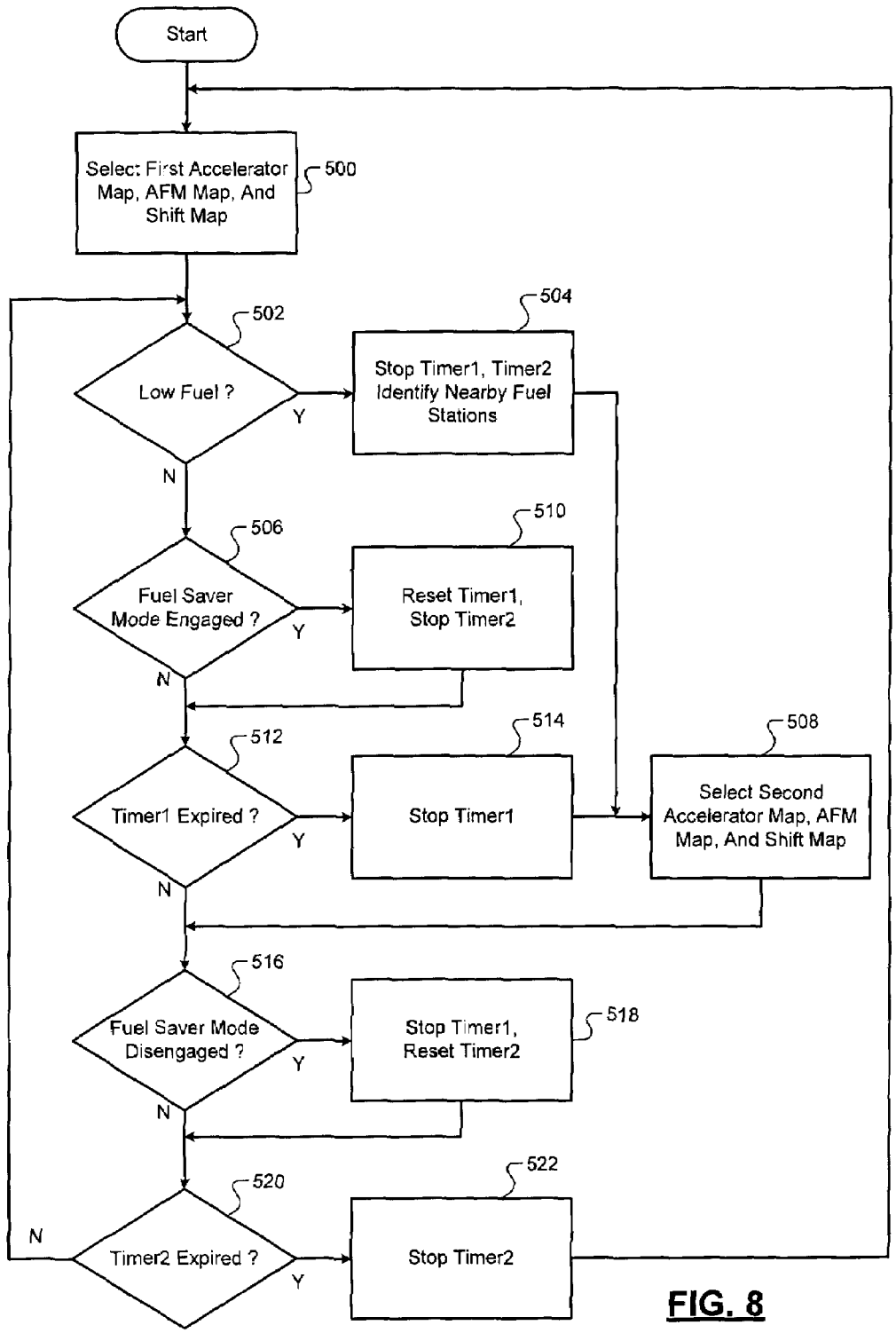
FIG. 8 is a flowchart that depicts exemplary steps performed in engaging FSM.

In addition, when a low fuel level is detected, this fact may be communicated to a navigation system in the vehicle. The navigation system in the vehicle may then identify and display the location of fueling stations close to the vehicle. FIG. 7 is an exemplary block diagram of a navigation system having this capability. FIG. 8 is a flowchart depicting exemplary steps performed in engaging FSM. Now a more detailed discussion of the FIGs. will be presented.

Referring now to FIG. 5, a functional block diagram of an exemplary powertrain system according to the principles of the present disclosure is shown. An internal combustion engine 200 is controlled by an engine control module (ECM) 204. The ECM 204 interfaces with a transmission control module 208, which controls a transmission 210. The engine 200 is coupled to the transmission 210 by a torque coupling device 214, such as a torque converter or clutch.

The ECM 204 receives accelerator input from a driver via an accelerator input module 218. For example, the accelerator input module 218 may include an accelerator pedal and a pedal position sensor. The ECM 204 receives transmission input from the driver via a transmission input module 220. The transmission input module 220 may include a gearshift lever, buttons, and/or paddles, for example.

The ECM 204 receives mode input from the driver via a driver mode input module 222. The driver mode input module 222 allows the driver to indicate that increased fuel economy is desired. For example, the driver mode input module 222 may include a button, which may indicate that the driver desires increased fuel economy once depressed. In various implementations, the button may be located on a lever of the transmission input module 220. In various implementations, the ECM 204 will activate fuel saver mode (FSM) when the driver mode input module 222 indicates that the driver desires increased fuel economy.

In various implementations, the driver mode input module 222 may allow the driver to select other vehicle operating modes. For example, the driver mode input module 222 may allow the driver to select tow/haul mode (THM) for use when towing or hauling cargo. In various implementations, FSM and THM may be multiplexed on a single button, where successive button presses cycle through both of the modes being enabled, each of the modes being enabled, and neither mode being enabled.

The ECM 204 may indicate the status of driver-selected modes via a driver indicator module 224. In various implementations, the driver indicator module 224 may include lights on an instrument panel of the vehicle that are illuminated when the corresponding mode is activated. In various implementations, the indicator corresponding to FSM may be located within the button that engages FSM. The driver indicator module 224 may also indicate when a low fuel level has been detected in a fuel system 228 of the vehicle.

Based on the selected modes and the accelerator and transmission inputs, the ECM 204 controls a throttle actuator module 232 and a cylinder actuator module 234. The throttle actuator module 232 actuates a throttle valve 236 to a position instructed by the ECM 204. The throttle actuator module 232 verifies the position of the throttle valve 236 via a throttle position sensor 238.

Air is drawn into an intake manifold 242 of the engine 200 via the throttle valve 236. The amount of air entering the intake manifold 242 may be measured by a mass air flow (MAF) sensor 244. Pressure within the intake manifold 242 may be measured using a manifold absolute pressure (MAP) sensor 246.

Air is mixed with fuel from the fuel system 228 in one or more cylinders 250. For example only, eight cylinders 250 are shown in FIG. 2, although more or fewer are possible. The air-fuel mixture is combusted within the cylinders 250 to produce torque to rotate a crankshaft (not shown). The speed of the crankshaft may be measured by an RPM (revolutions per minute) sensor 254. The cylinder actuator module 234 deactivates one or more of the cylinders 250 during active fuel management (AFM).

In various implementations, ones of the cylinders 250 may be deactivated as a group. Alternatively, the cylinder actuator module 234 may deactivate individual ones of the cylinders 250. The cylinder actuator module 234 may deactivate cylinders 250, such as by halting supply of fuel to those cylinders and/or preventing the opening of the intake and/or exhaust valves of those cylinders. The ECM 204 may also communicate with a navigation system 270, which may provide route information to the driver.

Referring now to FIG. 6, a functional block diagram of an exemplary implementation of the engine control module (ECM) 204 is presented. The ECM 204 includes a driver input interpretation module 302. The driver input interpretation module 302 receives accelerator input from the accelerator input module 218 and vehicle speed. In various implementations, vehicle speed may be calculated from RPM and transmission ratio.

The driver input interpretation module 302 determines a desired torque based on pedal position and vehicle speed using a mapping from a mapping storage module 306. The desired torque is output to a torque control module 310. The torque control module 310 may receive other torque requests, such as from a cruise control system or a traction control system.

Based on an arbitration of these torque requests, the torque control module 310 provides instructions to the cylinder actuator module 234 and the throttle actuator module 232 to produce the arbitrated torque. The torque control module 310 may receive a signal from an active fuel management (AFM) module 314 indicating whether and to what extent AFM can be used. Based on this signal, the torque control module 310 can control the cylinder actuator module 234.

The AFM module 314 may determine AFM availability based on MAP and RPM. The mapping from MAP and RPM to availability may be received from the mapping storage module 306. A transmission control module 318 receives transmission input from the transmission input module 220. Based on the transmission input, RPM, and accelerator input, the transmission control module 318 determines a desired ratio for the transmission 210.

The transmission input module 220 may specify to the transmission control module 208 which transmission ratios may be selected. For example only, the transmission input module 220 may specify whether an overdrive ratio is available. Based on a shift map from the mapping storage module 306, the transmission control module 208 may determine when to upshift and downshift based on RPM and accelerator input.

An OR gate 318 may output an active signal when FSM mode is activated in the driver mode input module 222 and/or when a low fuel level is indicated by the fuel system 228. The mapping storage module 306 receives the output of the OR gate 318. When the output signal is active, the mapping storage module 306 may select different mappings for the transmission control module 208, the driver input interpretation module 302, and the AFM module 314.

Referring now to FIG. 7, a functional block diagram of an exemplary implementation of the navigation system 270 is presented. The navigation system 270 includes a navigation control module 402, which interfaces with the ECM 204. The navigation system 270 also includes a global positioning system (GPS) receiver 406, a mapping database 410, an input module 414, and a display 418.

The navigation control module 402 displays information on the display 418 and receives user input via the input module 414. In various implementations, the display 418 may include a touch screen, which may also serve as part or all of the input module 414. The navigation control module 402 receives positioning information from the GPS receiver 406. The navigation control module 402 may also obtain position information in other ways, such as from terrestrial cellular networks.

The navigation control module 402 may display routing information from the mapping database 410. The routing information may include a course to a destination specified by the input module 414, and may be dynamically updated as the vehicle moves. In addition, the mapping database 410 may include information about businesses, such as fueling stations. For example only, the information may include times of operation, fuel types offered, and prices.

When the navigation control module 402 receives information from the ECM 204 that the fuel level is low, the navigation control module 402 may identify locations of nearby fueling stations from the mapping database 410 and present them on the display 418. In various implementations, the display 418 may indicate a boundary beyond which fueling stations may not be reachable with the current amount of fuel.

The mapping database 410 may be updated by a wireless interface module 422. The wireless interface module 422 may receive updates of mapping information via wireless transmissions, such as from satellite and/or terrestrial networks. In various implementations, updates may be received from update media, such as CDs or DVDs. The navigation control module 402 may request fueling station position information from the wireless interface module 422 based upon the current position of the vehicle.

The input module 414 may allow the user to specify desirable characteristics of fueling stations, such as corporation, facilities, and available fuel types. In addition, these preferences may be stored and/or preloaded into the navigation system 270. The wireless interface module 422 may allow a mapping provider, which may include the vehicle's manufacturer, to select fueling stations of partner companies.

For example, partnerships may be created between certain fueling station companies and the provider, and those fueling stations may be specially indicated. In addition, those fueling stations not owned by partner companies may be hidden on the display 418. In various implementations, hidden fueling stations may be displayed when no partner stations are within the vehicle's current range. The user may select one of the displayed fueling stations via the input module 414 or the navigation control module 402 may select the nearest fueling station. A temporary route may then be created to reach that fueling station.

Referring now to FIG. 8, a flowchart depicts exemplary steps performed in engaging fuel saver mode (FSM). Control begins in step 500, where first mappings are selected for at least one of accelerator pedal mapping, AFM mapping, and transmission shift pattern mapping. Control then continues in step 502, where control determines whether a low fuel condition is present. If so, control transfers to step 504; otherwise, control transfers to step 506. In step 504, control stops first and second timers. Control may also identify nearby fuel stations in a navigation system. Control then continues in step 508.

In step 506, control determines whether FSM has been engaged by the driver. If so, control transfers to step 510; otherwise, control transfers to step 512. In step 510, the first timer is reset, and the second timer is stopped. Control then continues in step 512. The first timer measures the period after FSM is engaged, while the second timer measures the period after FSM is disengaged.

After FSM has been engaged, the updated mappings may be delayed until the first timer has expired. In this way, if FSM is disengaged soon after it has been engaged, the updated mappings will not have been used. This prevents an abrupt change from normal mappings to FSM mappings and back to normal mappings. Engaging followed quickly by disengaging may occur frequently when a button is multiplexed between FSM and another function. In various implementations, the timer values may be less than approximately two seconds.

In step 512, control determines whether the first timer has expired. If so, control transfers to step 514; otherwise, control transfers to step 516. In step 514, the delay period after FSM was engaged has expired, and the first timer is stopped. Control continues in step 508, where second mappings are selected for the accelerator progression, AFM, and transmission shifting. Control then continues in step 516.

In step 516, control determines whether FSM has been disengaged. If so, control transfers to step 518; otherwise, control transfers to step 520. In step 518, the first timer is stopped, the second timer is reset, and control continues in step 520. In step 520, control determines whether the second timer has expired. If so, control transfers to step 522; otherwise, control returns to step 502. In step 522, the delay period after FSM being disengaged has expired and the second timer is stopped. Control then returns to step 500, where the first mappings are selected.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
a driver input module that generates a fuel saver mode (FSM) signal having a first state based upon a driver input;
a cylinder actuation module that, while a deactivation signal has a first state, selectively disables at least one of a plurality of cylinders of an engine; and
an active fuel management (AFM) module that generates the deactivation signal having the first state in response to an engine parameter being within a first range, wherein the first range has a first width while the FSM signal has the first state,
wherein the first range has a second width while the FSM signal has a second state, and
wherein the first width is wider than the second width.

2. The engine control system of claim 1 wherein the engine parameter includes manifold pressure.

3. The engine control system of claim 2, wherein:
a plurality of ranges corresponds respectively to a plurality of engine speeds; at least one of the plurality of ranges is wider while the FSM signal has the first state than while the FSM signal has the second state; and
the AFM module generates the deactivation signal having the first state in response to the manifold pressure being within one of the plurality of ranges corresponding to a current engine speed.

4. The engine control system of claim 3, wherein each of the plurality of ranges is wider while the FSM signal has the first state than while the FSM signal has the second state.

5. The engine control system of claim 1 wherein:
the first range is defined by a lower threshold and an upper threshold; and
while the FSM signal has the first state, the lower threshold is decreased and the upper threshold is increased.

6. The engine control system of claim 1 further comprising:
a throttle actuator module that actuates a throttle valve; and
a torque control module that controls the throttle actuator module based on a torque request and generates an AFM signal based on the torque request,
wherein the cylinder actuation module disables the at least one of the plurality of cylinders in response to the deactivation signal having the first state and the AFM signal having the first state.

7. The engine control system of claim 1 wherein the driver input module comprises a button, and wherein the driver input module generates the FSM signal based on the button and also generates a second mode signal based on the button.

8. The engine control system of claim 1 wherein the driver input module receives a fuel level signal and, in response to the fuel level signal being less than a predetermined threshold, generates the FSM signal having the first state.

9. The engine control system of claim 8 further comprising a navigation system that displays a fueling station location in response to the fuel level signal being less than the predetermined threshold and that identifies whether the fueling station location is within a current vehicle range based on the fuel level signal.

10. The engine control system of claim 1 further comprising a transmission control module that determines upshift and downshift events based on a shift mapping, wherein the shift mapping is modified while the FSM signal has the first state.

11. The engine control system of claim 10 wherein:
the shift mapping is based on accelerator pedal position and engine speed;
the shift mapping includes an upshift mapping and a downshift mapping;
while the FSM signal has the first state, the upshift mapping is modified to increase a limit of the accelerator pedal position where upshifts are generated; and
while the FSM signal has the first state, the downshift mapping is modified to increase a limit of the accelerator pedal position where downshifts are generated.

12. The engine control system of claim 1 further comprising a driver interpretation module that generates a torque signal based on a mapping from a driver accelerator pedal input to the torque signal, wherein the torque signal is one of a throttle position signal and a torque request signal, and wherein the mapping is modified while the FSM signal has the first state, and wherein the mapping is otherwise unmodified.

13. The engine control system of claim 12 wherein, for at least one value of the driver accelerator pedal input, the unmodified mapping generates a first value for the torque signal and the modified mapping generates a second value for the torque signal, the second value being less than the first value.

14. The engine control system of claim 12 wherein:
for a maximum value of the driver accelerator pedal input, the unmodified mapping generates a first value for the torque signal and the modified mapping generates a second value for the torque signal, the second value being equal to the first value;
for a minimum value of the driver accelerator pedal input, the unmodified mapping generates a third value for the torque signal and the modified mapping generates a fourth value for the torque signal, the third value being equal to the fourth value; and
for values of the driver accelerator pedal input between the minimum and maximum values, values generated for the torque signal by the modified mapping are less than values generated for the torque signal by the unmodified mapping.

15. The engine control system of claim 1 wherein, while the deactivation signal has a second state, the cylinder actuation module prevents disabling any of the cylinders.

16. The engine control system of claim 1 wherein the driver input module generates the FSM signal having the first state in response to a specific intent of a driver to enable fuel saver mode.

* * * * *